US011475243B2

(12) United States Patent
Zhang

(10) Patent No.: US 11,475,243 B2
(45) Date of Patent: Oct. 18, 2022

(54) TRAINING METHOD AND DEVICE FOR AN IMAGE ENHANCEMENT MODEL, AND STORAGE MEDIUM

(71) Applicant: Beijing Xiaomi Pinecone Electronics Co., Ltd., Beijing (CN)

(72) Inventor: Liang Zhang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 155 days.

(21) Appl. No.: 17/147,714

(22) Filed: Jan. 13, 2021

(65) Prior Publication Data

US 2021/0390340 A1 Dec. 16, 2021

(30) Foreign Application Priority Data

Jun. 12, 2020 (CN) .......................... 202010534243.9

(51) Int. Cl.
*G06T 5/00* (2006.01)
*G06K 9/62* (2022.01)
(Continued)

(52) U.S. Cl.
CPC ............ *G06K 9/6256* (2013.01); *G06T 5/002* (2013.01); *G06T 5/50* (2013.01); *G06T 7/13* (2017.01);
(Continued)

(58) Field of Classification Search
CPC ..................... G06T 2207/20076–20084; G06T 2207/10024; G06T 5/00–50; G06T 7/13; G06T 7/174; G06T 7/90
See application file for complete search history.

(56) References Cited

U.S. PATENT DOCUMENTS

2010/0020208 A1\* 1/2010 Barbu ...................... H04N 5/21
348/E5.079
2016/0065795 A1 3/2016 Baqai et al.
(Continued)

FOREIGN PATENT DOCUMENTS

CN 109214990 A 1/2019
CN 110188776 A 8/2019
(Continued)

OTHER PUBLICATIONS

Indian Office Action dated Jan. 7, 2022 in Indian Patent Application No. 202144002765, 6 pages.
(Continued)

*Primary Examiner* — Sean T Motsinger
(74) *Attorney, Agent, or Firm* — Oblon, McClelland, Maier & Neustadt, L.L.P.

(57) ABSTRACT

Aspects of the disclosure provide a training method and device for an image enhancement model and a storage medium. The method can include inputting each training input image group into the image enhancement model to obtain a predicted image output by the image enhancement model, and training the image enhancement model until convergence through each loss function respectively corresponding to each training pair. Each loss function can include a plurality of gray scale loss components corresponding to a plurality of frequency intervals one to one, and each gray scale loss component is determined based on a difference between a gray scale frequency division image of each predicted image and a gray scale frequency division image of the corresponding target image in each frequency interval, and different gray scale loss components correspond to different frequency intervals.

17 Claims, 4 Drawing Sheets

(51) Int. Cl.
  *G06T 7/13* (2017.01)
  *G06T 7/174* (2017.01)
  *G06T 7/90* (2017.01)
  *G06T 5/50* (2006.01)

(52) U.S. Cl.
  CPC .............. *G06T 7/174* (2017.01); *G06T 7/90* (2017.01); *G06T 2207/10024* (2013.01); *G06T 2207/20076* (2013.01); *G06T 2207/20081* (2013.01)

(56) References Cited

U.S. PATENT DOCUMENTS

| | | |
|---|---|---|
| 2020/0051217 A1 | 2/2020 | Shen et al. |
| 2020/0051260 A1 | 2/2020 | Shen et al. |
| 2020/0058106 A1 | 2/2020 | Lazarus et al. |
| 2020/0364500 A1 | 11/2020 | Huang |
| 2021/0390340 A1* | 12/2021 | Zhang .................... G06T 7/174 |
| 2022/0092795 A1* | 3/2022 | Liu ....................... G06N 3/084 |
| 2022/0138455 A1* | 5/2022 | Nagano ................ G06V 40/161 382/118 |
| 2022/0222786 A1* | 7/2022 | Ke .......................... G06T 5/005 |

FOREIGN PATENT DOCUMENTS

| | | |
|---|---|---|
| CN | 110210524 A | 9/2019 |
| CN | 110782034 A | 2/2020 |
| CN | 110827219 A | 2/2020 |
| JP | 2018-195069 A | 12/2018 |
| WO | WO 2019/003474 A1 | 1/2019 |
| WO | WO 2019/134879 A1 | 7/2019 |

OTHER PUBLICATIONS

Extended European Search Report dated Aug. 2, 2022 in European Patent Application No. 21155377.1, 5 pages.
Notice of Reasons for Refusal dated Mar. 30, 2022 in Japanese Patent Application No. 2021-018016 (with English language translation), 4 pages.

* cited by examiner

TRAINING METHOD AND DEVICE FOR AN IMAGE ENHANCEMENT MODEL, AND STORAGE MEDIUM

CROSS-REFERENCE TO RELATED APPLICATION

This application is based upon and claims priority to Chinese Patent Application No. CN202010534243.9, filed on Jun. 12, 2020, the entire contents of which are incorporated herein by reference.

TECHNICAL FIELD

The present disclosure relates to an image processing technology, including to a training method and device for an image enhancement model and a storage medium.

BACKGROUND

Mobile terminals generally have a photographing function. The insufficient sampling rate of image sensors in the mobile terminals and noise from various aspects of image acquisition, transmission, compression, and the like usually lead to detail loss and excessive color noise of images photographed by the mobile terminals. Images and videos taken in low light environments also have such problems, and the problems are more severe in images taken by smart phones with small aperture cameras. In addition, the aliasing phenomenon may be also caused when a sampling rate is low in an image acquisition process.

SUMMARY

The present disclosure provides a training method and device for an image enhancement model and a storage medium.

According to a first aspect of the disclosure, a training method for an image enhancement model is provided. The training method for the image enhancement model can include determining a plurality of sample image groups photographed by a shooting device, and determining a target image and a training input image group, which are associated with each sample image group. The method can further include constructing a plurality of training pairs, wherein each training pair includes a training input image group and a corresponding target image, and inputting each training input image group into the image enhancement model to obtain a predicted image output by the image enhancement model. The method can further include performing frequency division processing on gray scale component images of the predicted images to obtain gray scale frequency division images of the predicted images in a plurality of frequency intervals, and performing frequency division processing on gray scale component images of the corresponding target images to obtain gray scale frequency division images of the target images in the plurality of frequency intervals, and training the image enhancement model until convergence through loss functions respectively corresponding to the plurality of training pairs. Each loss function includes a plurality of gray scale loss components corresponding to the plurality of frequency intervals one to one, each gray scale loss component is determined based on a difference between the gray scale frequency division image of each predicted image and the gray scale frequency division image of the corresponding target image in each frequency interval, and different gray scale loss components correspond to different frequency intervals.

According to a second aspect of the disclosure, a training device for an image enhancement model is provided. The training device for the image enhancement module can include a first determination module that is configured to determine a plurality of sample image groups photographed by a shooting device, a second determination module that is configured to determine a target image and a training input image group, which are associated with each sample image group, and a construction module that is configured to construct a plurality of training pairs, wherein each training pair includes a training input image group and a corresponding target image. Further, the device can include an input module that is configured to input each training input image group into the image enhancement model to obtain a predicted image output by the image enhancement model, a frequency division module that is configured to perform frequency division processing on gray scale component images of the predicted images to obtain gray scale frequency division images of the predicted images in a plurality of frequency intervals, and perform frequency division processing on gray scale component images of the corresponding target images to obtain gray scale frequency division images of the target images in the plurality of frequency intervals, and a training module that is configured to train the image enhancement model until convergence through loss functions respectively corresponding to the plurality of training pairs, wherein each loss function includes a plurality of gray scale loss components corresponding to the plurality of frequency intervals one to one, each gray scale loss component is determined based on a difference between the gray scale frequency division image of each predicted image and the gray scale frequency division image of the corresponding target image in each frequency interval, and different gray scale loss components correspond to different frequency intervals.

According to a third aspect of the disclosure, a training device for an image enhancement model is provided. The training device for the image enhancement model can include a processor and a memory configured to store instructions executable by the processor. The processor may be configured to implement the steps of the abovementioned method by executing the executable instructions in the memory.

According to a fourth aspect of the disclosure, a non-transitory computer-readable storage medium is provided, which has executable instructions stored thereon. The non-transitory computer-readable storage medium is characterized in that the executable instructions, when executed by a processor, can implement the steps of the abovementioned method.

It should be understood that the above general descriptions and the following detailed descriptions are exemplary and explanatory only, and are not intended to limit the disclosure.

BRIEF DESCRIPTION OF THE DRAWINGS

The drawings herein, which are incorporated in and constitute a part of the specification, illustrate embodiments consistent with the disclosure, and explain the principles of the disclosure together with the specification.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of apparatuses and methods consistent with some aspects of the disclosure as detailed in the appended claims.

Mobile terminals generally have a photographing function. The insufficient sampling rate of image sensors in the mobile terminals and noise from various aspects of image acquisition, transmission, compression, and the like usually lead to detail loss and excessive color noise of images photographed by the mobile terminals. Images and videos taken in low light environments also have such problems, and the problems are more severe in images taken by smart phones with small aperture cameras. In addition, the aliasing phenomenon may be also caused when a sampling rate is low in an image acquisition process. With the increasing demand of users for a better image effect, how to further improve image resolution, enrich image details and reduce image noise can be a technical problem that always needs to be solved.

In a traditional image enhancement method, pixels at the same position in a plurality of images are subjected to weighted average to obtain a processed image, so that a denoising effect is achieved. Or, sub-pixel alignment and image fusion are performed to keep details at a high-frequency part in the images. How to effectively select appropriate pixels for weighted fusion and complete sub-pixel alignment makes big sense to an image enhancement effect.

With the rapid development of a deep learning technology, a depth image enhancement model has been used to complete image enhancement. First, a large number of natural images are used as training data, so that the depth image enhancement model learns mapping from low-quality images to high-quality images, but most of depth image enhancement models have a problem of over-smoothing, so it is difficult to effectively enhance image details while denoising, and a loss function in the depth image enhancement model has a great influence on the effect. Considering that image restoration is a visual task with a low feature level, a loss function with a pixel level is usually used at present.

Figure 1:
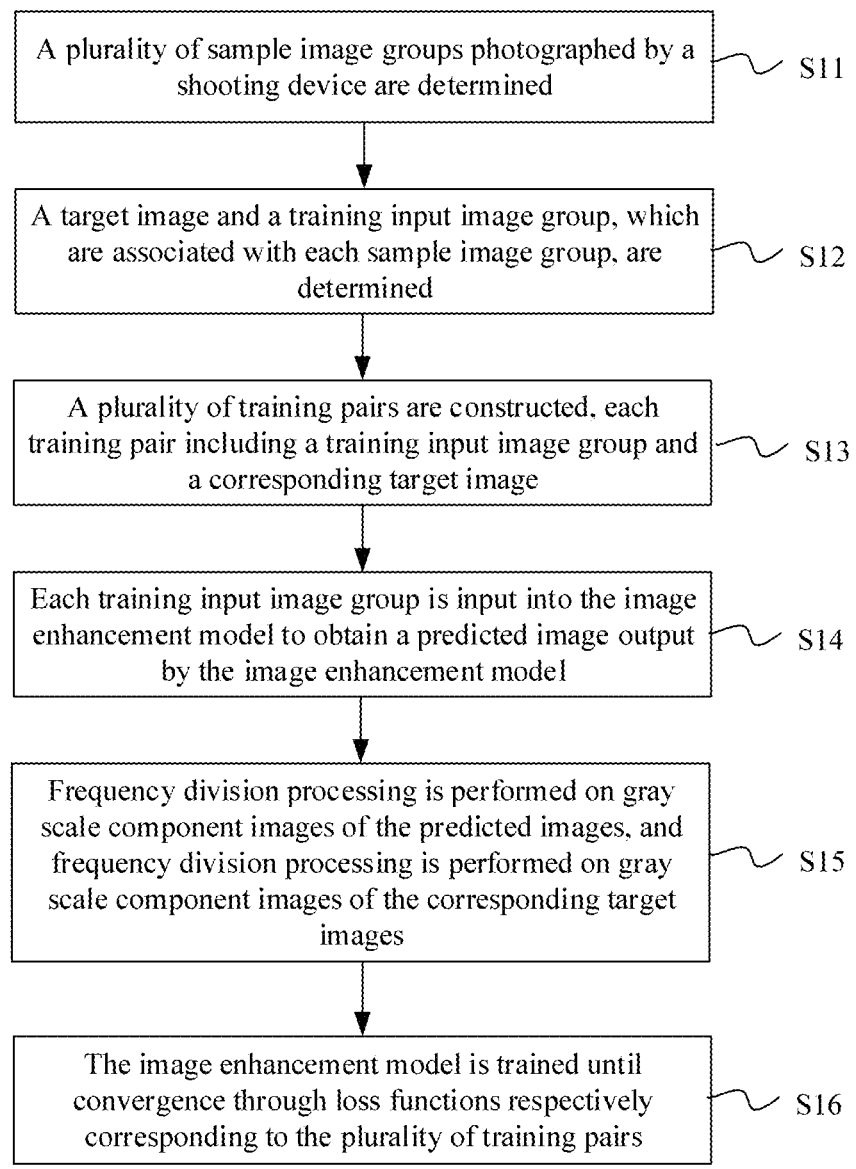
FIG. 1 is a flowchart of a training method for an image enhancement model according to an exemplary embodiment.

The embodiment of the present disclosure provides a training method for an image enhancement model. Referring to FIG. 1, FIG. 1 is a flowchart of the training method for the image enhancement model according to an exemplary embodiment. As shown in FIG. 1, the method include the following steps.

In step S11, a plurality of sample image groups photographed by a shooting device are determined.

Next, in step S12, a target image and a training input image group, which are associated with each sample image group, are determined.

In step S13, a plurality of training pairs are constructed, each training pair including a training input image group and a corresponding target image.

In step S14, each training input image group is input into the image enhancement model to obtain a predicted image output by the image enhancement model.

In step S15, frequency division processing is performed on gray scale component images of the predicted images to obtain gray scale frequency division images of the predicted images in a plurality of frequency intervals, and frequency division processing is performed on gray scale component images of the corresponding target images to obtain gray scale frequency division images of the target images in the plurality of frequency intervals.

Finally, in step S16, the image enhancement model can be trained until convergence through loss functions respectively corresponding to the plurality of training pairs, wherein each loss function includes a plurality of gray scale loss components corresponding to the plurality of frequency intervals one to one, each gray scale loss component is determined based on a difference between the gray scale frequency division image of each predicted image and the gray scale frequency division image of the corresponding target image in each frequency interval, and different gray scale loss components correspond to different frequency intervals.

In the embodiment, the loss functions associated with the training pairs are defined. Considering that detail characteristics of images mainly exist in gray scale components, frequency division information of gray scale component images of predicated images and frequency division information of gray scale component images of target images when an image enhancement model uses the training pairs may be added to the loss functions. Different loss functions are used for different training pairs to enable the loss functions to reflect content information and semantic information of the predicted images and the target images in the training pairs. Thus, over-smoothing caused by the ill-posed problem in the training process of the image enhancement model is effectively relieved.

The embodiment of the present disclosure provides a training method for an image enhancement model. The method includes the one as shown in FIG. 1. In step S12, determining the target image associated with each sample image group may further include one of the following operations.

Operation 1, an average of pixels at the same position is calculated based on each sample image in each sample image group to obtain the target image.

Operation 2, a weighted average of pixels at the same position is calculated based on each sample image in each sample image group to obtain the target image.

Operation 3, a first frame of sample image or a last frame of sample image is selected from each sample image group as a reference image, a feature point are calculated based on each sample image in each sample image group, a characteristic point alignment operation is performed on other sample images in each sample image group based on the reference image, and multi-frame image fusion is performed on the sample images subjected to the alignment operation to obtain the target image.

Operation 4, a sample image with the highest definition is selected from each sample image group as a reference image, a feature point are calculated based on each sample image in each sample image group, a characteristic point alignment operation is performed on other sample images in each sample image group based on the reference image, and multi-frame image fusion is performed on the sample images subjected to the alignment operation to obtain the target image.

A method for calculating the definition of the sample images may include: gradient values of all the images are obtained through a Laplacian, a gradient value of each image is calculated, and the definition is determined based on the gradient values, wherein the gradient values are in direct proportion to the definition. The sample image with the highest definition is selected as the sample image with the highest gradient value.

After the reference image is determined, other input images may be made to be aligned with the reference image based on the feature point and an optical flow method. Fusion processing may be performed after alignment. A difference between pixels at the same position may be calculated in the fusion process. The difference is generally caused by a noise and a change of part of contents. A weight in fusion may be determined based on the difference. A difference between the part of contents easily leads to artifacts after fusion, and difference of noise is favorable for denoising. The balance between denoising and artifact removal may be obtained by adjusting the weight. By performing noise estimation on the images, a noise amplitude of each group of images can be known. When the noise is strong, it means that the difference between other images and a reference frame is mainly noise. In this case, the weights of the other images can be properly increased, so that the denoising effect after fusion is good, otherwise, a lower weight is kept to avoid generation of artifacts.

In the embodiment, a plurality of frames of low-quality sample images are fused to obtain a high-quality target image. Noise simulation and fuzzy simulation are not involved, so that the target image carries more detail features of the sample images, which is favorable for a machine image enhancement model to learn detail features.

The embodiment of the present disclosure provides a training method for an image enhancement model. The method includes the method shown in FIG. 1. In S11, when shooting is performed through the shooting device, the shooting device may be fixed on a stable supporting device, such as a tripod, for continuous shooting. Shooting scenes of sample images in the same sample image group are the same, and shooting scenes of sample images in different sample image groups are different. For example: the shooting scenes may include: a scene for shooting printed content at a short distance, an office scene, a selfie scene of a person, a landscape scene, a building scene, and the like.

In an implementation, in step S12, determining the training input image group associated with each sample image group may include one of the following manners:

In manner 1, each sample image group is taken as each training input image group. In manner 2, part of sample images are selected from each sample image group to form each training input image group.

The selecting operation in the manner 2 may include one of following ways: selecting a plurality of images in the middle of a shooting sequence, calculating the definition of each image and selecting first multiple images of a preset proportion in the definition ranking, calculating the definition of each image and selecting a preset number of first multiple images according to the definition ranking. In an implementation, when the sample images in each sample image group are of a first fixed number, data of the selected part of sample images is of a second fixed number, and the first fixed number is greater than the second fixed number.

For example, step S11 may involve 500 scenes, and 20 images are continuously taken in each scene to form a sample image group. In step S12, when the abovementioned manner 1 is used, the sample image groups may be taken as the training input image groups to construct 500 training pairs. Each training pair includes a training input image group and a target image, and each training input image group includes 20 sample images. In step S12, when the abovementioned manner 2 is used, 10 sample images may be selected from each sample image group to constitute a training input image group, so that 500 training pairs are constructed, each training pair includes a training input image group and a target image, and each training input image group includes 10 sample images.

In the embodiment, a training input image group associated with a sample image group is determined, thereby providing an option for different compatibility degrees of sample images. When the compatibility degree of the sample images is high, all the sample images in each sample image group are enabled to be trained based on the above manner 1. When the compatibility degree of the sample images is low, the sample images in each sample image group are subjected to screening and then the selected sample images are used for training based on the manner 2.

The embodiment of the present disclosure provides a method for an image enhancement model. The method includes the method shown in FIG. 1. In S15, before frequency division processing, gray scale component images of the predicted images output by the image enhancement model and gray scale component images of the target images are calculated.

An image photographed by a shooting device is generally a RGB image and includes a red component image, a yellow component image and a blue component image. The image may be converted into a YUV image which includes a gray scale component, a chrominance component and a color saturation component through the following relations:

$Y=0.299*R+0.587*G+0.114*B;$ $U=-0.1678*R-0.3313*G+0.5*B;$ $Y=0.5*R-0.4187*G-0.0813*B.$

The gray scale component image Y_G of the target image G and the gray scale component image Y_R of the predicted image R can be obtained by the above conversion method.

When an image photographed by a shooting device is an image of a YUV type color space, a gray scale component image may be extracted from the image.

In step S15, frequency division processing is performed on the gray scale component image Y_G of the target image G to obtain gray scale frequency division images of the target image G in different frequency intervals. Frequency division processing is performed on the gray scale component image Y_R of the predicted image R to obtain gray scale frequency division images of the gray scale component image Y_R of the predicted image R in different frequency intervals.

The embodiment of the present disclosure provides a method for an image enhancement model. The method includes the method shown in FIG. 1. In the method, the number of frequency intervals can be 2, 3 or more. When frequency division processing is performed, a frequency interval is determined by the radius of Gaussian filtering. For example, an original image is A. Gaussian filtering with radius R and variance 0 may be performed on A to obtain a low-frequency image B, B may be subtracted from A to obtain C, and C is a high-frequency image. Radius R determines an interval between B and C. The larger the R is, the more components the C has. Similarly, Gaussian filtering on B can be continued to obtain a lower-frequency D, and D may be subtracted from B to obtain E. E is a high frequency with respect to D, but an intermediate frequency with respect to C. Or when the number of the frequency intervals is more than two, different band-pass filters may be adopted for filtering, and frequency division images corresponding to the frequency intervals can be obtained.

In an implementation, the number of frequency intervals is two, and each loss function includes two gray scale loss components. The two gray scale loss components include a low-frequency loss component and a high-frequency loss component.

In step S15, performing frequency division processing on the gray scale component images of the predicted images to obtain the gray scale frequency division images of the predicted images in the plurality of frequency intervals includes: performing low-pass filtering on the gray scale component images of the predicted images to obtain first gray scale low-frequency images, and calculating differences between the gray scale component images of the predicted images and the first gray scale low-frequency images to take the differences as first gray scale high-frequency images; and the gray scale frequency division images of the predicted images in the two frequency intervals include the first gray scale low-frequency images and the first gray scale high-frequency images.

In step S15, performing frequency division processing on the gray scale component images of the target images to obtain the gray scale frequency division images of the target images in the plurality of frequency intervals includes: performing low-pass filtering on the gray scale component images of the target images to obtain second gray scale low-frequency images, and calculating differences between the gray scale component images of the target images and the second gray scale low-frequency images to take the differences as second gray scale high-frequency images; and the gray scale frequency division images of the target images in two frequency intervals include the second gray scale low-frequency images and the second gray scale high-frequency images.

Figure 2:
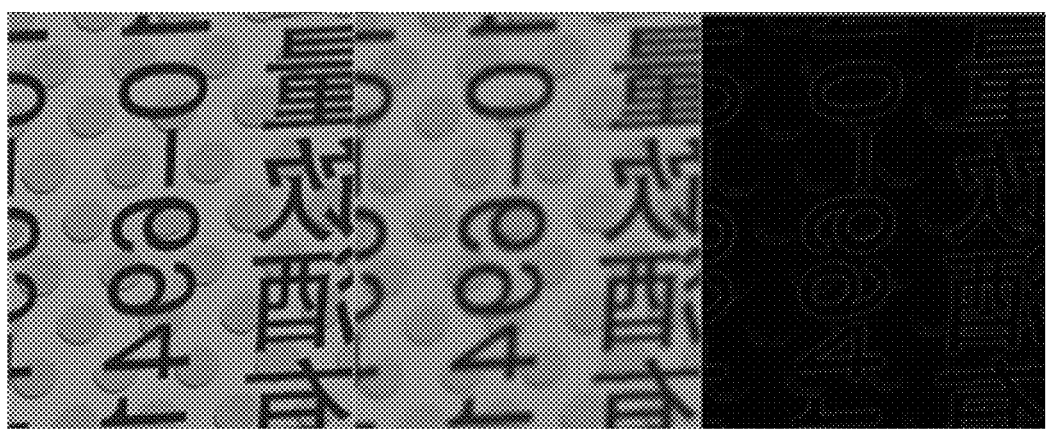
FIG. 2 is a gray scale component image of a target image, a low-frequency image of the gray scale component image and a high-frequency image of the gray scale component image according to an exemplary embodiment.

For example, when the gray scale component image Y_G of the target image G is subjected to frequency division processing in two frequency intervals, a gray scale low-frequency image Y_G_baselayer of the target image G can be obtained, and the gray scale component image Y_G may be subtracted from the gray scale low-frequency image Y_G_baselayer to obtain a gray scale high-frequency image Y_G_detaillayer of the target image G. The three images shown in FIG. 2 are a gray scale component image, a gray scale low-frequency image and a scale gray high-frequency image of the target image which are sequentially arranged from left to right as an example.

In an implementation, the number of frequency intervals is two, and each loss function includes two gray scale loss components; and the two gray scale loss components include a low-frequency loss component and a high-frequency loss component.

In step S15, performing frequency division processing on the gray scale component images of the predicted images to obtain the gray scale frequency division images of the predicted images in the plurality of frequency intervals includes: performing high-pass filtering on the gray scale component images of the predicted images to obtain first gray scale high-frequency images, and calculating differences between the gray scale component images of the predicted images and the first gray scale high-frequency images to take the differences as first gray scale low-frequency images; and the gray scale frequency division images of the predicted images in the two frequency intervals include the first gray scale low-frequency images and the first gray scale high-frequency images.

In step S15, performing frequency division processing on the gray scale component images of the target images to obtain the gray scale frequency division images of the target images in the plurality of frequency intervals includes: performing high-pass filtering on the gray scale component images of the target images to obtain second gray scale high-frequency images, and calculating differences between the gray scale component images of the target images and the second gray scale high-frequency images to take the differences as second gray scale low-frequency images; and the gray scale frequency division images of the target images in two frequency intervals include the second gray scale low-frequency images and the second gray scale high-frequency images.

Each loss function M_Loss is a matrix, and includes a sum of the gray scale loss components, as shown in formula (1):

$$M\_Loss = K1 \times Y\_detaillayer\_dif + K2 \times Y\_baselayer\_dif \quad (1)$$

where K1 is a weighting coefficient corresponding to a high-frequency interval. Y_detaillayer_dif is a difference between the gray scale high-frequency image Y_G_detaillayer of the gray scale component image Y_G of the target image G and the gray scale high-frequency image Y_R_detaillayer of the gray scale component image Y_R of the predicted image R.

K2 is a weighting coefficient corresponding to a low-frequency interval. Y_baselayer_dif is a difference between the gray scale low-frequency image Y_R_baselayer of the gray scale component image Y_G of the target image G and the gray scale low-frequency image Y_R_baselayer of the gray scale component image Y_R of the predicted image R.

K1 is larger than K2. In order to embody more image details, the weight of a component with higher frequency is made to be larger, which represents the weighting coefficient of the gray scale loss component corresponding to a frequency interval with higher frequency is larger. The characterization frequency is a frequency representing the position of each frequency interval, e.g., the characterization frequency is the highest frequency, the lowest frequency, the center frequency, etc. of each frequency interval, or the characterization frequency includes both the highest frequency and the lowest frequency. There is no overlap between different frequency intervals.

In an implementation, the number of frequency intervals is three. Each loss function includes three gray scale loss components; and the three gray scale loss components include a low-frequency loss component, an intermediate-frequency loss component, and a high-frequency loss component.

Each loss function M_Loss is a matrix, and includes a sum of the gray scale loss components, as shown in formula (2):

$$M\_Loss = X1 \times Y\_FHlayer\_dif + X2 \times Y\_FMlayer\_dif + X3 \times Y\_FLlayer\_dif \quad (2)$$

where X1 is a weighting coefficient corresponding to a high-frequency interval. Y_FHlayer_dif is a difference between a gray scale high-frequency image Y_G_FHlayer of the gray scale component image Y_G of the target image G and a gray scale high-frequency image Y_R_FHlayer of the gray scale component image Y_R of the predicted image R.

X2 is a weighting coefficient corresponding to the intermediate-frequency interval. Y_FMlayer_dif is a difference between a gray scale intermediate-frequency image Y_G_FMlayer of the gray scale component image Y_G of the target image G and a gray scale intermediate-frequency image Y_R_FMlayer of the gray scale component image Y_R of the predicted image R.

X3 is a weighting coefficient corresponding to the low-frequency interval. Y_FLlayer_dif is a difference between a gray scale low-frequency image Y_G_FLlayer of the gray scale component image Y_G of the target image G and a gray scale low-frequency image Y_R_FLlayer of the gray scale component image Y_R of the predicted image R.

The higher the characterization frequency of the frequency interval is, the greater the weighting coefficient in the corresponding gray scale loss component is, i.e., X1 is greater than X2 and X2 is greater than X3.

In an implementation, the number of frequency intervals is four. Each loss function includes four gray scale loss components; and the four gray scale loss components include a first loss component, a second loss component, a third loss component, and a fourth loss component from high to low frequency. Similarly, the loss functions may further include four or more gray scale loss components.

In the embodiment, the higher the characterization frequency of the frequency interval is, the greater the weighting coefficient in the corresponding gray scale loss component is, so that more image details can be presented, and the loss functions are enabled to represent information of more image details.

The embodiment of the present disclosure provides a method for an image enhancement model. The method includes the method shown in FIG. 1, and may further include performing edge detection on the gray scale component images of the target images in the plurality of training pairs to obtain edge images Y_G_edge, and determining an edge probability map Y_G_P based on the edge images Y_G_edge. In the loss functions, the gray scale loss component corresponding to the frequency interval with the highest characterization frequency may include a dot product matrix of the edge probability map and differences between the gray scale frequency division images of the predicted images in the frequency interval and the gray scale frequency division images of the corresponding target images in the frequency interval.

A plurality of edge detection methods are provided, such as a Canny detection method. The Canny detection method includes at least one of the following steps.

In Step 1, Gaussian filtering is implemented to remove noise and perform smoothing processing.

In Step 2, a non-maximum suppression technology is applied to eliminate edge false detections, preserve the maximum value of the gradient intensity at each pixel, and delete values other than the maximum value.

In Step 3, a double-threshold method is applied to determine a possible (potential) boundary, and two thresholds are set. Edges which are larger than the high threshold are strong edges, edges which are smaller than the low threshold are not edges, and edges which are between the high threshold and the low threshold are undetermined edges.

In Step 4, the boundary is tracked by a hysteresis technology, the undetermined edges connected with the strong edges are taken as edges, and otherwise, the undetermined edges are not edges.

In an implementation, determining the edge probability map Y_G_P based on the edge images Y_G_edge may include performing guiding filtering on the edge images Y_G_edge to obtain the edge probability map Y_G_P. Guiding maps in the guiding filtering may be the target images or the gray scale component images of the target images. Guiding filtering is a kind of image filtering technology. The edge images Y_G_edge may be filtered through a guiding map, so that the final predicted image can keep the detected edges as much as possible, the noise which is mistakenly detected as the edge can be removed as much as possible, finally the probability map Y_G_P is obtained. A probability value of a pixel of the probability map indicates the probability of the pixel being an edge point.

In an implementation, each loss function includes two gray scale loss components, and the two gray scale loss components include a low-frequency loss component and a high-frequency loss component.

Each loss function M_Loss is a matrix, and includes a sum of the gray scale loss components, as shown in formula (3):

$$M\_Loss = K1 \times Y\_G\_P * Y\_\text{detaillayer\_dif} + K2 \times Y\_\text{baselayer\_dif} \quad (3)$$

where K1 is a weighting coefficient corresponding to a high-frequency interval. Y_G_P is the edge probability graph Y_G_P obtained by performing guiding filtering on the edge image Y_G_edge of the gray scale component image of the target image. Y_detaillayer_dif is a difference between a gray scale high-frequency image Y_G_detaillayer of a gray scale component image Y_G of the target image G and a gray scale high-frequency image Y_R_detaillayer of a gray scale component image Y_R of the predicted image R, and * denotes a matrix dot multiplication operation. K2 is a weighting coefficient of a low-frequency interval, and Y_baselayer_dif is a difference between a gray scale low-frequency image Y_G_baselayer of the gray scale component image Y_G of the target image G and a gray scale low-frequency image Y_R_baselayer of the gray scale component image Y_R of the predicted image R.

In an implementation, when the number of frequency intervals is three, the frequency intervals are divided into a low-frequency interval, an intermediate-frequency interval and a high-frequency interval, and each loss function includes three gray scale loss components. The three gray scale loss components include a low-frequency loss component, an intermediate-frequency loss component, and a high-frequency loss component.

Each loss function is a matrix M_Loss, and includes a sum of the gray scale loss components, as shown in formula (4):

$$M\_Loss = X1 \times Y\_G\_P * Y\_FH\text{layer\_dif} + X2 \times Y\_FM\text{layer\_dif} + X3 \times Y\_FL\text{layer\_dif} \quad (4)$$

where X1 is a weighting coefficient corresponding to the high-frequency interval. Y_G_P is a probability image Y_G_P obtained by performing guiding filtering on the edge image Y_G_edge of the gray scale component image of the target image. Y_FHlayer_dif is a difference between a gray scale high-frequency image Y_G_FHlayer of a gray scale component image Y_G of the target image G and a gray scale high-frequency image Y_R_FHlayer of a gray scale component image Y_R of the predicted image R, and * denotes a matrix dot product operation.

X2 is a weighting coefficient corresponding to the intermediate-frequency interval, and Y_FMlayer_dif is a difference between a gray scale intermediate-frequency image Y_G_FMlayer of the gray scale component imageY_G of the target image G and a gray scale intermediate-frequency image Y_R_FMlayer of the gray scale component image Y_R of the predicted image R.

X3 is a weighting coefficient corresponding to the low-frequency interval, and Y_FLlayer_dif is a difference between a gray scale low-frequency image Y_G_FLlayer of the gray scale component image Y_G of the target image G and a gray scale low-frequency image Y_R_FLlayer of the gray scale component image Y_R of the predicted image R.

In the embodiment, semantic information of images is increased in the loss functions by increasing the weight of probability images in a gray scale loss component corresponding to a frequency interval with the highest characterization frequency so as to solve the problem of sample unbalance.

The embodiment of the present disclosure provides a method for an image enhancement model. The method includes the method shown in FIG. 1, in which each loss function further includes chrominance loss components and/or color saturation loss components besides the sum of the gray scale loss components. Specifically, each loss function includes the sum of the plurality of gray scale loss components and a sum of the chrominance loss components, each loss function includes the sum of the plurality of gray scale loss components and a sum of the color saturation loss components, or each loss function includes the sum of the plurality of gray scale loss components, and the sum of the chrominance loss components and the color saturation loss components.

The chrominance loss components are differences between chrominance component images of the predicted images output by the image enhancement model and chrominance component images of the corresponding target images. The color saturation loss components are differences between color saturation component images of the predicted images output by the image enhancement model and color saturation component images of the corresponding target images.

In an implementation, on the basis of the formula (1), the loss functions may be any one of formulas (5), (6) and (7):

$$M\_Loss = K1 \times Y\_detaillayer\_dif + K2 \times Y\_baselayer\_dif + U\_dif \quad (5)$$

$$M\_Loss = K1 \times Y\_detaillayer\_dif + K2 \times Y\_baselayer\_dif + V\_dif \quad (6)$$

$$M\_Loss = K1 \times Y\_detaillayer\_dif + K2 \times Y\_baselayer\_dif + U\_dif + V\_dif \quad (7)$$

On the basis of the formula (3), the loss functions may be any one of formulas (8), (9) and (10):

$$M\_Loss = K1 \times Y\_G\_P \ast Y\_detaillayer\_dif + K2 \times Y\_baselayer\_dif + U\_dif \quad (8)$$

$$M\_Loss = K1 \times Y\_G\_P \ast Y\_detaillayer\_dif + K2 \times Y\_baselayer\_dif + V\_dif \quad (9)$$

$$M\_Loss = K1 \times Y\_G\_P \ast Y\_detaillayer\_dif + K2 \times Y\_baselayer\_dif + U\_dif + V\_dif \quad (10)$$

, where U_dif is a difference between a chrominance component image U_G of the target image G and a chrominance component image U_R of the predicted image R. V_dif is a difference between a color saturation component image V_G of the target image G and a color saturation component image V_R of the predicted image R.

In the case that the number of frequency intervals is greater than two, the loss functions are set in the same manner as in the case that the number of frequency intervals is two, which will not be described in detail herein.

The embodiment of the present disclosure provides a method for image enhancement. The method includes, after an image enhancement model is successfully trained through the abovementioned training method, an image to be processed is enhanced through the successfully trained image enhancement model.

Figure 3:
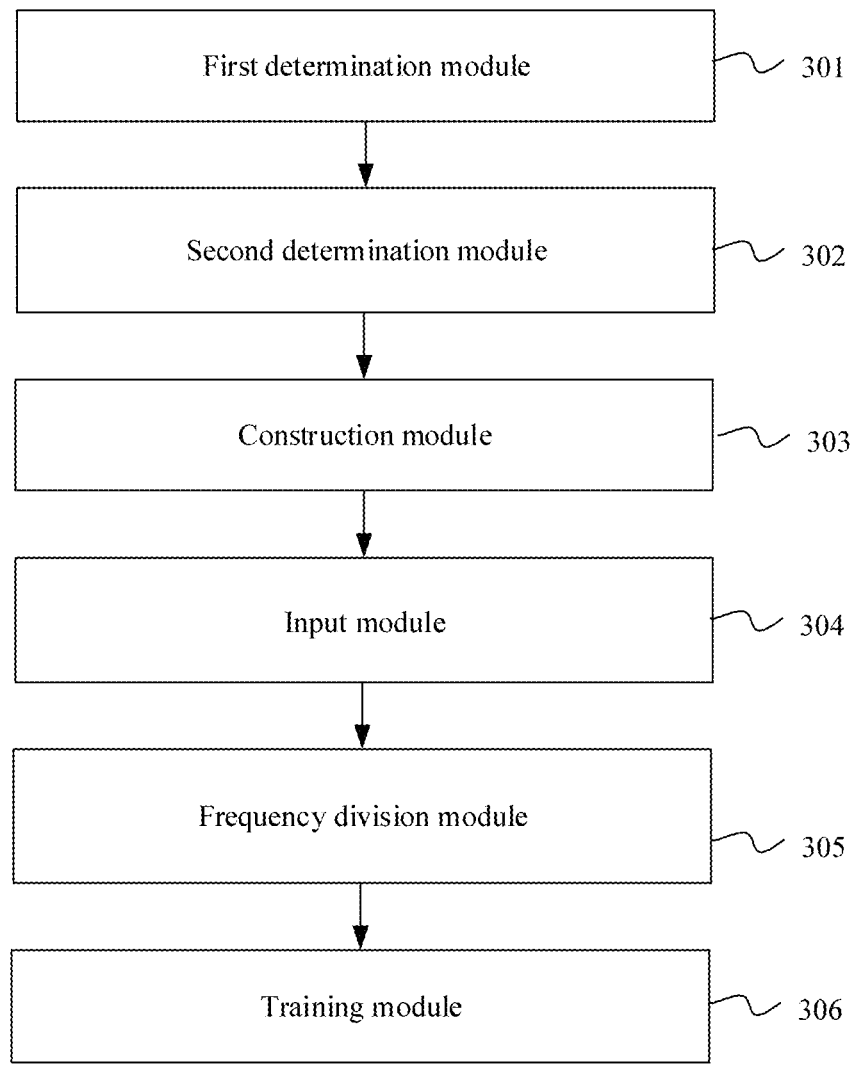
FIG. 3 is a structural diagram of a training device for an image enhancement model according to an exemplary embodiment.

The embodiment of the present disclosure provides a training device for an image enhancement model. FIG. 3 is a structural diagram of the training device for the image enhancement model according to an exemplary embodiment. Of course, it should be understood that one or more of the modules described in this specification can be implemented by circuitry.

As shown in FIG. 3, the training device includes a first determination module 301 that is configured to determine a plurality of sample image groups photographed by a shooting device, and a second determination module 302 that is configured to determine a target image and a training input image group, which are associated with each sample image group. The device can further include a construction module 303 that is configured to construct a plurality of training pairs, wherein each training pair includes a training input image group and a corresponding target image, and an input module 304 that is configured to input each training input image group into the image enhancement model to obtain a predicted image output by the image enhancement model. Additionally, the device can include a frequency division module 305 that is configured to perform frequency division processing on gray scale component images of the predicted images to obtain gray scale frequency division images of the predicted images in a plurality of frequency intervals, and perform frequency division processing on gray scale component images of the corresponding target images to obtain gray scale frequency division images of the target images in the plurality of frequency intervals, an a training module 306 that is configured to train the image enhancement model until convergence through loss functions respectively corresponding to the plurality of training pairs, wherein each loss function includes a plurality of gray scale loss components corresponding to the plurality of frequency intervals one to one, each gray scale loss component is determined based on a difference between the gray scale frequency division image of each predicted image and the gray scale frequency division image of the corresponding target image in each frequency interval, and different gray scale loss components correspond to different frequency intervals.

In an implementation, the higher a loss characterization frequency of the frequency intervals in the loss functions is, the greater a weighting coefficient in the corresponding gray scale loss components is.

The embodiment of the present disclosure provides a training device for an image enhancement model. The training device includes the training device shown in FIG. 3. Each loss function may include two gray scale loss components; and the two gray scale loss components include a low-frequency loss component and a high-frequency loss component.

The frequency division module 305 is further configured to perform frequency division processing on the gray scale component images of the predicted images to obtain the gray scale frequency division images of the predicted images in the plurality of frequency intervals by operations of performing low-pass filtering on the gray scale component images of the predicted images to obtain first gray scale low-frequency images, and calculating differences between the gray scale component images of the predicted images and the first gray scale low-frequency images to take the differences as first gray scale high-frequency images, and the gray scale frequency division images of the predicted images in two frequency intervals include the first gray scale low-frequency images and the first gray scale high-frequency images.

The frequency division module 305 is further configured to perform frequency division processing on the gray scale component images of the target images to obtain the gray scale frequency division images of the target images in the plurality of frequency intervals by operations of performing low-pass filtering on the gray scale component images of the target images to obtain second gray scale low-frequency images, and calculating differences between the gray scale component images of the target images and the second gray scale low-frequency images to take the differences as second gray scale high-frequency images, and the gray scale frequency division images of the target images in two frequency intervals include the second gray scale low-frequency images and the second gray scale high-frequency images.

The embodiment of the present disclosure provides a training device for an image enhancement model. The training device includes the training device shown in FIG. 3. Each loss function may include two gray scale loss components, and the two gray scale loss components include a low-frequency loss component and a high-frequency loss component.

The frequency division module 305 is further configured to perform frequency division processing on the gray scale component images of the predicted images to obtain the gray scale frequency division images of the predicted images in the plurality of frequency intervals by operations of performing high-pass filtering on the gray scale component images of the predicted images to obtain first gray scale high-frequency images, and calculating differences between the gray scale component images of the predicted images and the first gray scale high-frequency images to take the differences as first gray scale low-frequency images, and the gray scale frequency division images of the predicted images in two frequency intervals include the first gray scale low-frequency images and the first gray scale high-frequency images.

The frequency division module 305 is further configured to perform frequency division processing on the gray scale component images of the target images to obtain the gray scale frequency division images of the target images in the plurality of frequency intervals performing high-pass filtering on the gray scale component images of the target images to obtain second gray scale high-frequency images, and calculating differences between the gray scale component images of the target images and the second gray scale high-frequency images to take the differences as second gray scale low-frequency images, and the gray scale frequency division images of the target images in two frequency intervals include the second gray scale low-frequency images and the second gray scale high-frequency images.

The embodiment of the present disclosure provides a training device for an image enhancement model. The training device includes the training device shown in FIG. 3, and the device further includes an edge detection module that is configured to perform edge detection on the gray scale component images of the target images in the plurality of training pairs to obtain edge images, and an edge probability calculation module that is configured to determine an edge probability map based on the edge images.

A gray scale loss component corresponding to a frequency interval with a highest characterization frequency in each loss function comprises a dot product matrix of the edge probability map and differences between the gray scale frequency division images of the predicted images in the frequency interval and the gray scale frequency division images of the corresponding target images in the frequency interval.

In an implementation, the edge probability calculation module is configured to determine the edge probability map based on the edge images by performing guiding filtering on the edge images to obtain the edge probability map, wherein guiding maps in the guiding filtering are the target images or the gray scale component images of the target images.

The embodiment of the present disclosure provides a training device for an image enhancement model. The training device includes the training device shown in FIG. 3.

Each loss function may include a sum of the plurality of gray scale loss components, each loss function may include the sum of the plurality of gray scale loss components and a sum of chrominance loss components, each loss function may include the sum of the plurality of gray scale loss components and a sum of color saturation loss components, or each loss function may include the sum of the plurality of gray scale loss components, and a sum of chrominance loss components and color saturation loss components.

The chrominance loss components are differences between chrominance component images of the predicted images output by the image enhancement model and chrominance component images of the corresponding target images; and the color saturation loss components are differences between color saturation component images of the predicted images output by the image enhancement model and color saturation component images of the corresponding target images.

The embodiment of the present disclosure provides a training device for an image enhancement model. The training device includes the training device in FIG. 3. Shooting scenes of sample images in the same sample image group are the same, and shooting scenes of sample images in different sample image groups are different.

The second determination module 302 is further configured to determine the target image associated with each sample image group through one of the following operations of an average of pixels at the same position is calculated based on each sample image in each sample image group to obtain the target image, a weighted average of pixels at the same position is calculated based on each sample image in each sample image group to obtain the target image, and a sample image with the highest definition, a first frame of sample image or a last frame of sample image is selected from each sample image group as a reference image, a feature point are calculated based on each sample image in each sample image group, a characteristic point alignment operation is performed on other sample images in each sample image group based on the reference image, and multi-frame image fusion is performed on the sample images subjected to the alignment operation to obtain the target image.

The second determination module is further configured to determine the training input image group associated with each sample image group through one of the following operations that each sample image group is taken as each training input image group, and part of sample images are selected from each sample image group to form each training input image group.

The embodiment of the present disclosure provides an image enhancement device. The image enhancement device includes the abovementioned training device and an enhancement processing module. The enhancement processing module is configured to use an image enhancement model successfully trained by the training device for enhancement processing on images to be processed.

The embodiment of the present disclosure provides a training device for an image enhancement model. The training device for the image enhancement model can include a processor and a memory that is configured to store instructions executable by the processor. The processor is configured to implement the steps of the abovementioned method by executing the executable instructions in the memory.

The embodiment of the present disclosure provides a non-transitory computer-readable storage medium, which has executable instructions stored thereon. The non-transitory computer-readable storage medium is characterized in that the executable instructions, when executed by a processor, implement the steps of the abovementioned method.

Figure 4:
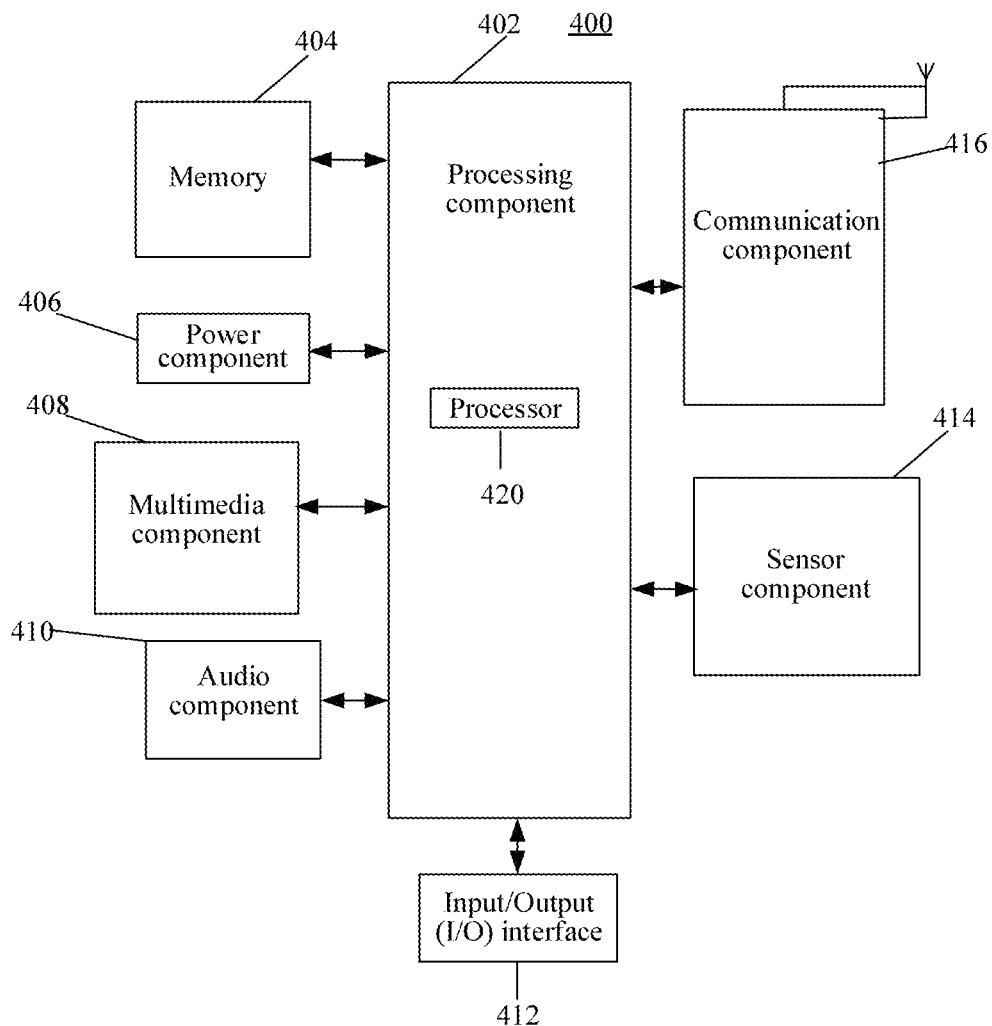
FIG. 4 is a structural diagram of a training device for an image enhancement model according to an exemplary embodiment.

FIG. 4 is a block diagram of a device 400 for training an image enhancement model according to an exemplary embodiment. For example, the device 400 may be a mobile phone, a computer, a digital broadcasting terminal, a message transceiver device, a game console, a tablet device, a medical device, a fitness device, a personal digital assistant, and the like.

Referring to FIG. 4, the device 400 may include one or more following components of a processing component 402, a memory 404, a power component 406, a multimedia component 408, an audio component 410, an Input/Output (I/O) interface 412, a sensor component 414, and a communication component 416.

The processing component 402 generally controls overall operations of the device 400, such as operations related to displaying, telephone calls, data communications, camera operations, and recording operations. The processing component 402 may include one or more processors 420 to execute instructions to complete all or part of the steps of the method described above. In addition, the processing component 402 may include one or more modules to facilitate the interaction between the processing component 402 and other components. For example, the processing component 402 may include a multimedia module to facilitate the interaction between the multimedia component 408 and the processing component 402.

The memory 404 is configured to store various types of data to support the operations of the device 400. Examples of such data include instructions for any application program or method operated on the device 400, contact data, phone book data, messages, pictures, videos, and the like. The memory 404 may be implemented by any type of volatile or non-volatile storage devices or a combination thereof, such as a Static Random Access Memory (SRAM), an Electrically Erasable Programmable Read-Only Memory (EEPROM), an Erasable Programming Read-Only Memory (EPROM), a Programmable Read-Only Memory (PROM), a Read-Only Memory (ROM), a magnetic memory, a flash memory, a magnetic disk or an optical disk.

The power component 406 provides power for various components of the device 400. The power component 406 may include a power management system, one or more power supplies, and other components associated with generating, managing, and distributing power for the device 400.

The multimedia component 408 includes a screen that provides an output interface between the device 400 and a user. In some embodiments, the screen may include a LCD and a TP. If the screen includes the TP, the screen may be implemented as a touch screen to receive an input signal from a user. The TP includes one or more touch sensors to sense touch, swipe, and gestures on the TP. The touch sensors may not only sense a boundary of a touch or swipe action, but also detect duration and pressure related to the touch or swipe operation. In some embodiments, the multimedia component 408 includes a front camera and/or a rear camera. The front camera and/or the rear camera may receive external multimedia data while the device 400 is in an operation mode, such as a photographing mode or a video mode. Each front camera and each rear camera may be fixed optical lens systems or may have focal lengths and optical zoom capabilities.

The audio component 410 is configured to output and/or input audio signals. For example, the audio component 410 includes a microphone (MIC), and the microphone is configured to receive an external audio signal when the device 400 is in an operation mode, such as a calling mode, a recording mode, and a voice identification mode. The received audio signals may be further stored in the memory 404 or transmitted via the communication component 416. In some embodiments, the audio component 410 may further include a speaker configured to output audio signals.

The I/O interface 412 provides an interface between the processing component 402 and peripheral interface modules, which may be keyboards, click wheels, buttons, etc. These buttons may include, but not limited to a home button, a volume button, a start button, and a lock button.

The sensor component 414 includes one or more sensors configured to provide various aspects of state assessment for the device 400. For example, the sensor component 414 may detect an open/closed status of the device 400, and relative positioning of components. For example, the component is the display and the keypad of the device 400. The sensor component 414 may also detect a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of objects nearby without any physical contact. The sensor component 414 may also include light sensors, such as CMOS or CCD image sensors, for use in imaging applications. In some embodiments, the sensor component 414 may also include an acceleration sensor, a gyroscope sensor, a magnetic sensor, a pressure sensor, or a temperature sensor.

The communication component 416 is configured to facilitate a wired or wireless communication between the device 400 and other devices. The device 400 may access a wireless network based on any communication standard, such as Wi-Fi, 2G or 3G, or combinations thereof. In one exemplary embodiment, the communication component 416 receives broadcast signals or broadcast related information from an external broadcast management system via a broadcast channel. In one exemplary embodiment, the communication component 416 further includes a Near Field Communication (NFC) module to facilitate short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In the exemplary embodiment, the device 400 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In the exemplary embodiment, a non-transitory computer-readable storage medium including an instruction, such as a memory 404 including an instruction, is further provided. The instruction may be executed by a processor 420 of a device 400 to complete the foregoing method. For example, the non-transitory computer-readable storage medium may be a Read Only Memory (ROM), a Random Access Memory (RAM), a Compact Disc Read Only Memory (CD-ROM), a magnetic tape, a floppy disk, an optical data storage device, and the like.

The technical scheme provided by the embodiments of the present disclosure can have beneficial effects. For example, the loss functions associated with training pairs are defined. Considering that detail characteristics of images mainly exist in gray scale components, frequency division information of gray scale component images of predicated images and frequency division information of gray scale component images of target images when an image enhancement model uses the training pairs may be added to the loss functions. Different loss functions are used for different training pairs to enable the loss functions to reflect content information and semantic information of the predicted images and the target images in the training pairs. Thus, over-smoothing caused by the ill-posed problem in the training process of the image enhancement model is effectively relieved.

Other embodiments of the present disclosure will be apparent to those skilled in the art from consideration of the specification and practice of the disclosure herein. The disclosure is intended to cover any variations, uses or adaptations of the disclosure following the general principles thereof and including such departures from the disclosure as come within known or customary practice in the art. It is intended that the specification and the embodiments are considered as being exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A training method for an image enhancement model, comprising:
   determining a plurality of sample image groups photographed by a shooting device;
   determining a target image and a training input image group, which are associated with each sample image group;
   constructing a plurality of training pairs that each include a training input image group and a corresponding target image;
   inputting each training input image group into the image enhancement model to obtain a predicted image output by the image enhancement model;
   performing a frequency division processing on gray scale component images of the predicted images to obtain gray scale frequency division images of the predicted images in a plurality of frequency intervals, and performing a frequency division processing on gray scale component images of the corresponding target images to obtain gray scale frequency division images of the target images in the plurality of frequency intervals; and
   training the image enhancement model until convergence through loss functions respectively corresponding to the plurality of training pairs,
   wherein each loss function includes a plurality of gray scale loss components corresponding to the plurality of frequency intervals one to one, each gray scale loss component is determined based on a difference between the gray scale frequency division image of each predicted image and the gray scale frequency division image of the corresponding target image in each frequency interval, and different gray scale loss components correspond to different frequency intervals.

2. The training method according to claim 1, wherein a higher characterization frequency of the frequency intervals corresponds to a greater weighting coefficient in the corresponding gray scale loss components.

3. The training method according to claim 1, wherein each loss function includes two gray scale loss components having a low-frequency loss component and a high-frequency loss component,
   performing frequency division processing on the gray scale component images of the predicted images to obtain the gray scale frequency division images of the predicted images in the plurality of frequency intervals further includes performing low-pass filtering on the gray scale component images of the predicted images to obtain first gray scale low-frequency images, and calculating differences between the gray scale component images of the predicted images and the first gray scale low-frequency images to take the differences as first gray scale high-frequency images, and the gray scale frequency division images of the predicted images in two frequency intervals further include the first gray scale low-frequency images and the first gray scale high-frequency images, and
   performing frequency division processing on the gray scale component images of the target images to obtain the gray scale frequency division images of the target images in the plurality of frequency intervals further includes performing low-pass filtering on the gray scale component images of the target images to obtain second gray scale low-frequency images, and calculating differences between the gray scale component images of the target images and the second gray scale low-frequency images to take the differences as second gray scale high-frequency images, and the gray scale frequency division images of the target images in two frequency intervals further include the second gray scale low-frequency images and the second gray scale high-frequency images.

4. The training method according to claim 1, wherein each loss function further includes two gray scale loss components, and the two gray scale loss components further include a low-frequency loss component and a high-frequency loss component;
   performing frequency division processing on the gray scale component images of the predicted images to obtain the gray scale frequency division images of the predicted images in the plurality of frequency intervals further comprises performing high-pass filtering on the gray scale component images of the predicted images to obtain first gray scale high-frequency images, and calculating differences between the gray scale component images of the predicted images and the first gray scale high-frequency images to take the differences as first gray scale low-frequency images, and the gray scale frequency division images of the predicted images in two frequency intervals further include the first gray scale low-frequency images and the first gray scale high-frequency images;

performing frequency division processing on the gray scale component images of the target images to obtain the gray scale frequency division images of the target images in the plurality of frequency intervals further includes performing high-pass filtering on the gray scale component images of the target images to obtain second gray scale high-frequency images, and calculating differences between the gray scale component images of the target images and the second gray scale high-frequency images to take the differences as second gray scale low-frequency images, and the gray scale frequency division images of the target images in two frequency intervals further include the second gray scale low-frequency images and the second gray scale high-frequency images.

5. The training method according to claim 1, further comprising:

performing edge detection on the gray scale component images of the target images in the plurality of training pairs to obtain edge images, and determining an edge probability map based on the edge images; and wherein a gray scale loss component corresponding to a frequency interval with a highest characterization frequency in each loss function further includes a dot product matrix of the edge probability map and differences between the gray scale frequency division images of the predicted images in the frequency interval and the gray scale frequency division images of the corresponding target images in the frequency interval.

6. The training method according to claim 5, wherein determining the edge probability map based on the edge images further comprises:

performing guiding filtering on the edge images to obtain the edge probability map, wherein guiding maps in the guiding filtering are the target images or the gray scale component images of the target images.

7. The training method according to claim 1, wherein each loss function further comprises:

a sum of the plurality of gray scale loss components;

a sum of the plurality of gray scale loss components and a sum of chrominance loss components;

a sum of the plurality of gray scale loss components and a sum of color saturation loss components; or a sum of the plurality of gray scale loss components, and a sum of chrominance loss components and color saturation loss components, wherein the chrominance loss components are differences between chrominance component images of the predicted images output by the image enhancement model and chrominance component images of the corresponding target images, and the color saturation loss components are differences between color saturation component images of the predicted images output by the image enhancement model and color saturation component images of the corresponding target images.

8. The training method according to claim 1, wherein shooting scenes of sample images in a same sample image group are the same, and shooting scenes of sample images in different sample image groups are different, determining the target image associated with each sample image group comprises one of following operations:

calculating an average of pixels at a same position based on each sample image in each sample image group to obtain the target image;

calculating a weighted average of pixels at a same position based on each sample image in each sample image group to obtain the target image; and selecting a sample image with a highest definition, a first frame of sample image or a last frame of sample image from each sample image group as a reference image, calculating a feature point based on each sample image in each sample image group, performing a characteristic point alignment operation on other sample images in each sample image group based on the reference image, and performing multi-frame image fusion on the sample images subjected to the alignment operation to obtain the target image; and determining the training input image group associated with each sample image group further includes one of following manners:

taking each sample image group as each training input image group; and selecting part of sample images from each sample image group to form each training input image group.

9. A training device for an image enhancement model, comprising:

a processor; and a memory that is configured to store instructions executable by the processor;

wherein the processor is configured to:

determine a plurality of sample image groups photographed by a shooting device;

determine a target image and a training input image group, which are associated with each sample image group;

construct a plurality of training pairs having a training input image group and a corresponding target image;

input each training input image group into the image enhancement model to obtain a predicted image output by the image enhancement model;

perform frequency division processing on gray scale component images of the predicted images to obtain gray scale frequency division images of the predicted images in a plurality of frequency intervals, and perform frequency division processing on gray scale component images of the corresponding target images to obtain gray scale frequency division images of the target images in the plurality of frequency intervals; and train the image enhancement model until convergence through loss functions respectively corresponding to the plurality of training pairs, wherein each loss function includes a plurality of gray scale loss components corresponding to the plurality of frequency intervals one to one, each gray scale loss component is determined based on a difference between the gray scale frequency division image of each predicted image and the gray scale frequency division image of the corresponding target image in each frequency interval, and different gray scale loss components correspond to different frequency intervals.

10. The training device according to claim 9, wherein a higher characterization frequency of the frequency intervals corresponds to a greater weighting coefficient in the corresponding gray scale loss components.

11. The training device according to claim 9, wherein each loss function includes two gray scale loss components, and the two gray scale loss components include a low-frequency loss component and a high-frequency loss component;

the processor is further configured to perform frequency division processing on the gray scale component images of the predicted images to obtain the gray scale frequency division images of the predicted images in the plurality of frequency intervals by operations of performing low-pass filtering on the gray scale component images of the predicted images to obtain first gray scale low-frequency images, and calculating differences between the gray scale component images of the predicted images and the first gray scale low-frequency images to take the differences as first gray scale high-frequency images, and the gray scale frequency division images of the predicted images in two frequency intervals further include the first gray scale low-frequency images and the first gray scale high-frequency images; and the processor is further configured to perform frequency division processing on the gray scale component images of the target images to obtain the gray scale frequency division images of the target images in the plurality of frequency intervals by operations of performing low-pass filtering on the gray scale component images of the target images to obtain second gray scale low-frequency images, and calculating differences between the gray scale component images of the target images and the second gray scale low-frequency images to take the differences as second gray scale high-frequency images, and the gray scale frequency division images of the target images in two frequency intervals further include the second gray scale low-frequency images and the second gray scale high-frequency images.

12. The training device according to claim 9, wherein each loss function includes two gray scale loss components, and the two gray scale loss components include a low-frequency loss component and a high-frequency loss component;

the processor is further configured to perform frequency division processing on the gray scale component images of the predicted images to obtain the gray scale frequency division images of the predicted images in the plurality of frequency intervals by operations of performing high-pass filtering on the gray scale component images of the predicted images to obtain first gray scale high-frequency images, and calculating differences between the gray scale component images of the predicted images and the first gray scale high-frequency images to take the differences as first gray scale low-frequency images, and the gray scale frequency division images of the predicted images in two frequency intervals include the first gray scale low-frequency images and the first gray scale high-frequency images;

the processor is further configured to perform frequency division processing on the gray scale component images of the target images to obtain the gray scale frequency division images of the target images in the plurality of frequency intervals by operations of performing high-pass filtering on the gray scale component images of the target images to obtain second gray scale high-frequency images, and calculating differences between the gray scale component images of the target images and the second gray scale high-frequency images to take the differences as second gray scale low-frequency images, and the gray scale frequency division images of the target images in two frequency intervals include the second gray scale low-frequency images and the second gray scale high-frequency images.

13. The training device according to claim 9, wherein the processor is further configured to:

perform edge detection on the gray scale component images of the target images in the plurality of training pairs to obtain edge images; and determine an edge probability map based on the edge images; and wherein a gray scale loss component corresponding to a frequency interval with a highest characterization frequency in each loss function includes a dot product matrix of the edge probability map and differences between the gray scale frequency division images of the predicted images in the frequency interval and the gray scale frequency division images of the corresponding target images in the frequency interval.

14. The training device according to claim 13, wherein the processor is further configured to:

determine the edge probability map based on the edge images by performing guiding filtering on the edge images to obtain the edge probability map, wherein guiding maps in the guiding filtering are the target images or the gray scale component images of the target images.

15. The training device according to claim 9, wherein each loss function comprises:

a sum of the plurality of gray scale loss components;

a sum of the plurality of gray scale loss components and a sum of chrominance loss components;

a sum of the plurality of gray scale loss components and a sum of color saturation loss components;

a sum of the plurality of gray scale loss components and a sum of chrominance loss components and color saturation loss components;

wherein the chrominance loss components are differences between chrominance component images of the predicted images output by the image enhancement model and chrominance component images of the corresponding target images, and the color saturation loss components are differences between color saturation component images of the predicted images output by the image enhancement model and color saturation component images of the corresponding target images.

16. The training device according to claim 9, wherein shooting scenes of sample images in a same sample image group are the same, and shooting scenes of sample images in different sample image groups are different;

the processor is further configured to determine the target image associated with each sample image group through one of following operations:

calculating an average of pixels at a same position based on each sample image in each sample image group to obtain the target image;

calculating a weighted average of pixels at a same position based on each sample image in each sample image group to obtain the target image; and selecting a sample image with a highest definition, a first frame of sample image or a last frame of sample image from each sample image group as a reference image, calculating a feature point based on each sample image in each sample image group, performing characteristic point alignment operation on other sample images in each sample image group based on the reference image, and performing multi-frame image fusion on the sample images subjected to the alignment operation to obtain the target image; and the processor is further configured to determine the training input image group associated with each sample image group through one of following operations:

taking each sample image group as each training input image group; and selecting part of sample images from each sample image group to form each training input image group.

17. A non-transitory computer-readable storage medium, having executable instructions stored thereon that, when executed by a processor, implement the steps of:

determining a plurality of sample image groups photographed by a shooting device;

determining a target image and a training input image group, which are associated with each sample image group;

constructing a plurality of training pairs that each include a training input image group and a corresponding target image;

inputting each training input image group into an image enhancement model to obtain a predicted image output by the image enhancement model;

performing frequency division processing on gray scale component images of the predicted images to obtain gray scale frequency division images of the predicted images in a plurality of frequency intervals, and performing frequency division processing on gray scale component images of the corresponding target images to obtain gray scale frequency division images of the target images in the plurality of frequency intervals; and training the image enhancement model until convergence through loss functions respectively corresponding to the plurality of training pairs, wherein each loss function includes a plurality of gray scale loss components corresponding to the plurality of frequency intervals one to one, each gray scale loss component is determined based on a difference between the gray scale frequency division image of each predicted image and the gray scale frequency division image of the corresponding target image in each frequency interval, and different gray scale loss components correspond to different frequency intervals.

* * * * *